12) United States Patent
Katsuno (10) Patent No.: US 8,452,027 B2
(45) Date of Patent: May 28, 2013

(54) AUDIO CONFERENCE SYSTEM (75) Inventor: Manami Katsuno, Machida (JP)

(73) Assignee: Kabushiki Kaisha Audio-Technica, Tokyo (JP)

( * ) Notice: Subject to any disclaimer, the term of this patent is extended or adjusted under 35 U.S.C. 154(b) by 303 days.

(21) Appl. No.: 12/671,146

(22) PCT Filed: Jul. 28, 2008

(86) PCT No.: PCT/JP2008/063921
§ 371 (c)(1),
(2), (4) Date: Jan. 28, 2010

(87) PCT Pub. No.: WO2009/020082
PCT Pub. Date: Feb. 12, 2009

(65) Prior Publication Data
US 2010/0189286 A1    Jul. 29, 2010

(30) Foreign Application Priority Data
Aug. 9, 2007    (JP) ................................. 2007-208405

(51) Int. Cl.
H04B 3/00        (2006.01)
H04R 27/00       (2006.01)
H04R 3/00        (2006.01)

(52) U.S. Cl.
USPC .................................. 381/81; 381/80; 381/122

(58) Field of Classification Search
USPC ....................... 381/122, 77, 80, 81; 379/93.21, 379/158, 202.01
See application file for complete search history.

(56) References Cited

U.S. PATENT DOCUMENTS 7,593,520 B1 *   9/2009  Croak et al. ............. 379/202.01
2004/0125933 A1 * 7/2004  Jun et al. ................. 379/202.01
(Continued)

FOREIGN PATENT DOCUMENTS

CN          1255004 A       5/2000
EP          1686835 A1      8/2006
(Continued)

OTHER PUBLICATIONS

Chinese Office Action for corresponding application No. 200880102271.0, dated Apr. 25, 2012, English translation.
(Continued)

Primary Examiner — Devona Faulk
Assistant Examiner — David Ton
(74) Attorney, Agent, or Firm — Sughrue Mion, PLLC (57) ABSTRACT An audio conference system including a controller, a plurality of microphones, and an antenna that makes the controller and the microphones communicate via radio communication, in which the controller includes: an utterance permitting unit that, in response to utterance request instruction information received from any of the microphones, transmits utterance permission instruction information to the microphone; and an utterance inhibiting unit that, in response to utterance inhibition request instruction information received from any of the microphones, transmits utterance inhibition instruction information to the other microphones, and the microphones each include: an utterance requesting unit that transmits utterance request instruction information to the controller and transmits, to the controller, a speech signal input after receiving the utterance permission instruction information from the controller; and an utterance stopping unit that stops transmission of the speech signal to the controller upon receiving the utterance inhibition instruction information from the controller. According to the audio conference system, an audio conference system which allows the chair of a conference to collectively inhibit all utterances of the other participants can be obtained.

12 Claims, 8 Drawing Sheets

U.S. PATENT DOCUMENTS

| | | | |
|---|---|---|---|
| 2005/0213731 A1 * | 9/2005 | Rodman et al. | 379/202.01 |
| 2006/0234613 A1 | 10/2006 | Hans et al. | |
| 2007/0086365 A1 | 4/2007 | Chen et al. | |
| 2009/0028316 A1 * | 1/2009 | Jaiswal et al. | 379/202.01 |

FOREIGN PATENT DOCUMENTS

| | | | |
|---|---|---|---|
| JP | 7-322229 A | | 12/1995 |
| JP | 8-018676 A | | 1/1996 |
| JP | 2004-228648 A | | 8/2004 |
| JP | 2004228648 A | * | 8/2004 |
| JP | 2005-333498 A | | 12/2005 |
| JP | 2005333498 A | * | 12/2005 |
| JP | 2006-093829 | | 4/2006 |

OTHER PUBLICATIONS

Extended European Search Report dated Aug. 7, 2012, issued in Application No. 08778362.7.

Japanese Office Action dated Sep. 12, 2012, issued in JP Application No. 2009-526439.

Sennheiser, "Conference System SDC 8200", Feb. 2007, 127 pages, Germany.

Shure, "Shure Teleconference System Installer's Manual", 1992, 24 pages, United States.

* cited by examiner

AUDIO CONFERENCE SYSTEM

TECHNICAL FIELD

The present invention relates to an audio conference system used in a conference attended by many participants, and particularly to an audio conference system that allows the chair of a conference to collectively inhibit all utterances of the other participants.

BACKGROUND ART

In a conference attended by many participants, an audio conference system is used in which voice of a speaker is picked up with a microphone, amplified with an amplifier, and sent out over a speaker in a conference hall to make the voice of the speaker heard by all the participants.

In such an audio conference system, a large number of microphones, corresponding to the number of participants, are used. In a conventional audio conference system, a participant presses an utterance request button provided to a microphone upon making an utterance so that an utterance request command is transmitted from the microphone to a master control. The master control receiving the command performs certain utterance control.

The certain utterance control is: a process of allocating a communication channel to the microphone; and a process of transmitting a communication channel notification together with an utterance permission command to the microphone, both of which are performed by the master control receiving the utterance request command. When a speech is input to the microphone that has received the communication channel notification and the utterance permission command, the speech is output from, for example, a speaker via the master control.

If a communication channel between a microphone and the master control is a radio communication channel, the allocation of a communication channel performed by the master control is allocation control of frequencies to be used.

Among such audio conference systems in which communications between microphones and a master control are controlled through a plurality of radio channels, an audio conference system is known that performs radio channel allocation inhibition control to prevent communication jamming (for example, interference between electric waves) while being used together with another system using radio communication (for example, see Patent Document 1).

With an audio conference system disclosed in Patent Document 1, utterances made by participants in a conference can be mandatory limited by a master control.

Figure 7:
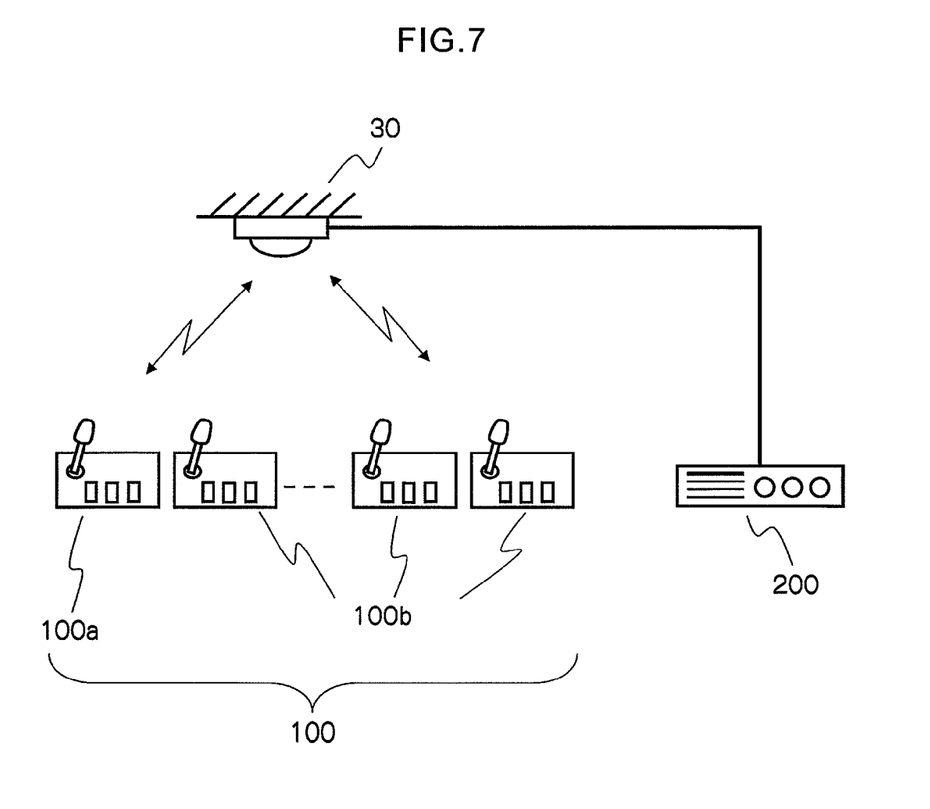
FIG. 7 is a schematic of a configuration of a conventional audio conference system.

FIG. 7 depicts an exemplary configuration of a conventional audio conference system. In FIG. 7, the audio conference system includes: extension microphones 100 including a priority microphone (hereinafter referred to as a "P microphone") 100a with which the chair of a conference, e.g., a chairman, can mandatory terminate an utterance of other participants when an utterance is being made with a microphone having an utterance permission, and general microphones 100b used by general participants; a master control 200 that receives utterance request commands and speeches transmitted from the extension microphones 100 and, in response thereto, transmits an utterance permission command, performs communication control including allocation control of frequencies to be used, and outputs the speeches transmitted from extension microphones via a speaker; and an antenna 300 that makes the extension microphones 100 and the master control 200 communicate, receives radio signals emitted from the extension microphones 100 and notifies the master control of the reception, and transmits, for example, a signal sent from the master control 200 to the extension microphones 100 as a radio signal.

Figure 8:
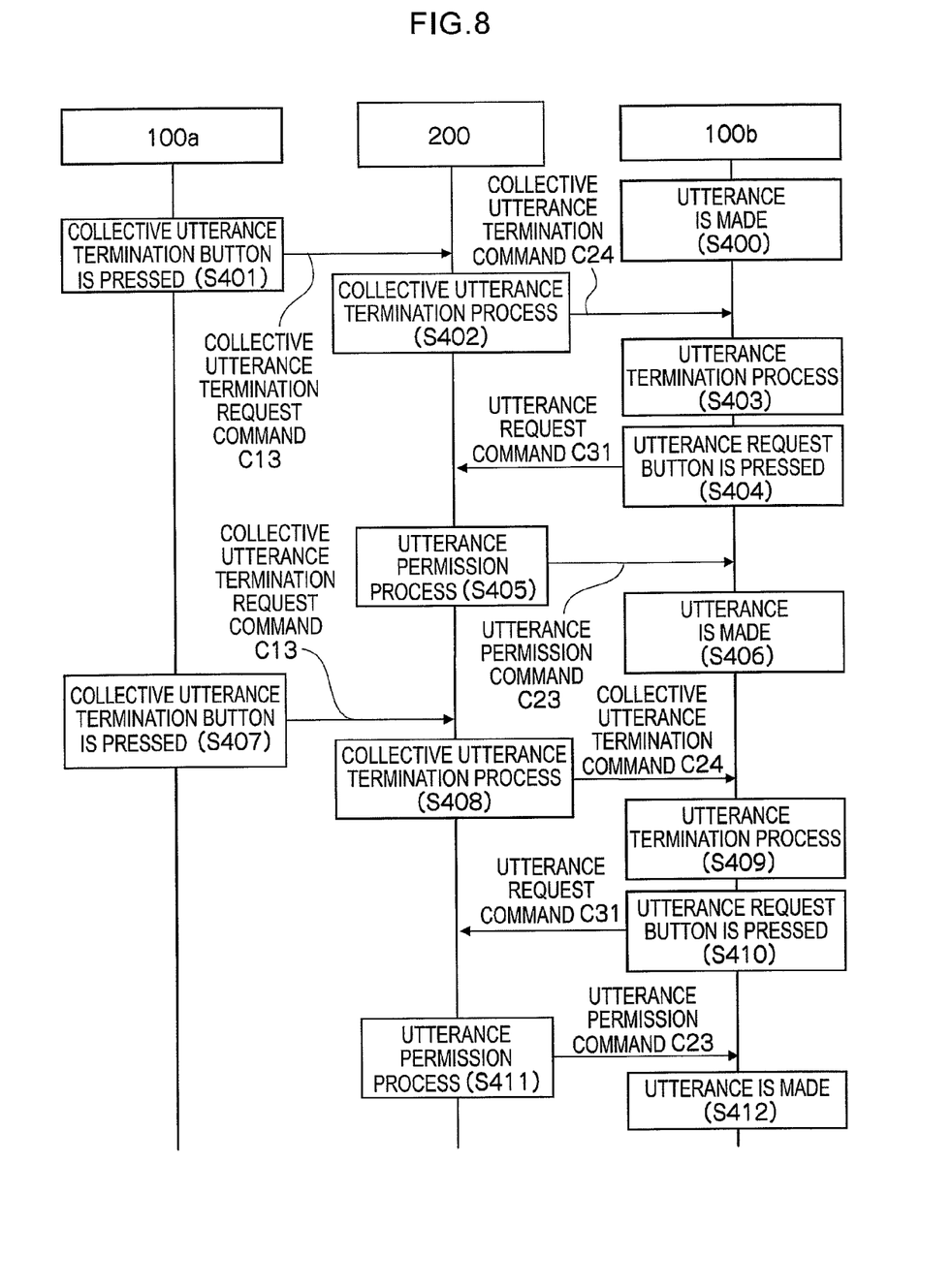
FIG. 8 is a block diagram depicting functional blocks of the conventional audio conference system.

An utterance control flow in the conventional audio conference device will be described with reference to the sequence diagram in FIG. 8. In FIG. 8, process steps are denoted as S400, S401, and so on.

While an utterance is being made with a general microphone 100b that has received the utterance permission command (S400), a collective utterance termination button, which is not shown in the figure, of the P microphone 100a is pressed and a collective utterance termination command C13 is transmitted to the master control 200 (S401). The master control 200, triggered by the received collective utterance termination command C13, performs a collective utterance termination process and transmits a collective utterance termination command C24 to the general microphone 100b (S402).

The general microphone 100b receiving the collective utterance termination command C24 performs an utterance termination process. A speech signal input thereafter is not transmitted to the master control 200 (S403). When an utterance request button, which is not shown in the figure, of the general microphone 100b is pressed after the utterance process is halted, an utterance request command C31 is transmitted to the master control 200 (S404).

The master control 200 receiving the utterance request command C31 performs an utterance permission process and transmits an utterance permission command C23 to the general microphone 100b (S405). The general microphone 100b receiving the utterance permission command C23 can transmit a speech signal input thereto to the master control 200 (S406).

As described above, the general microphone 100b of which the utterance therewith has been mandatory terminated through the collective utterance termination process (S402) can be used to make an utterance (S405 and S406) by again performing the utterance request process (S404). Therefore, to stop the utterance again, the collective utterance termination button of the P microphone 100a needs to be pressed again (S407) to transmit the collective utterance termination command C13 to the master control 200 so that the collective utterance termination process is performed (S408 and S409).

Unfortunately, if the utterance request is transmitted again (S409 and S41) from the general microphone 100b thereafter, the utterance therewith will be permitted in a similar manner.

As described above, in the conventional audio conference system, even if the chair of a conference collectively terminates the utterance permission of microphones used by other speakers to make the conference proceed smoothly, when the utterance request button of a general microphone 100b is pressed, an utterance can be made therewith. Thus, control of an utterance with the general microphone 100b cannot be maintained.

[Patent Document 1] Japanese Patent Application Laid-Open No. 2005-333498

DISCLOSURE OF INVENTION

Problem to be Solved by the Invention

The present invention has been made in light of the above problem and an object of the present invention is to provide an audio conference system that allows the chair of a conference to collectively inhibit all utterances of the other participants and in which the inhibition state can be maintained so that a speech input with other microphones can be effectively controlled.

Means for Solving Problem

The present invention is an audio conference system including a controller, a plurality of microphones, and an antenna that makes the controller and the microphones communicate via radio communication, in which the controller includes: an utterance permitting unit that, in response to utterance request instruction information received from any of the microphones, transmits utterance permission instruction information to the microphone; and an utterance inhibiting unit that, in response to utterance inhibition request instruction information received from any of the microphones, transmits utterance inhibition instruction information to the other microphones, and the microphones each include: an utterance requesting unit that transmits utterance request instruction information to the controller and transmits, to the controller, a speech signal input after receiving the utterance permission instruction information from the controller; and an utterance stopping unit that stops transmission of the speech signal to the controller upon receiving the utterance inhibition instruction information from the controller.

In the present invention, the controller further includes an operating mode control unit that switches an operating mode in response to reception of the utterance inhibition request instruction information and maintains the operating mode.

Furthermore, in the present invention, when the operating mode at a point where the utterance request instruction information is received from any of the microphones is an utterance inhibition mode, the operating mode control unit operates the utterance permitting unit so that no utterance permission instruction information is transmitted to the microphone.

Still furthermore, the present invention is an audio conference system including a controller, a plurality of microphones, and an antenna that makes the controller and the microphones communicate via radio communication, in which the controller includes: an utterance permitting unit that, in response to utterance request instruction information received from any of the microphones, transmits utterance permission instruction information to the microphone; and an utterance inhibiting unit that, in response to utterance inhibition request instruction information received from any of the microphones, transmits utterance inhibition instruction information to the other microphones, and the microphones each include: an utterance stopping unit that transmits the utterance inhibition request information to the controller and stops transmission of a speech signal to the controller upon receiving the utterance inhibition instruction information from the controller; and an operating mode control unit that switches an operating mode in response to the utterance inhibition request instruction information received from the controller and maintains the operating mode.

Still furthermore, in the present invention, when an operating mode upon transmitting the utterance request instruction information is an utterance inhibition mode, the operating mode control unit operates the utterance requesting unit so that no utterance permission request information is transmitted to the controller.

In addition, the present invention is an audio conference system including a controller, a plurality of microphones, and an antenna that makes the controller and the microphones communicate via radio communication, in which the controller includes an utterance permitting unit that, in response to utterance request instruction information received from any of the microphones, transmits utterance permission instruction information to the microphone, and the microphones each include: an utterance stopping unit with which the microphones except one microphone stop, after receiving utterance inhibition request instruction information from the one microphone, transmission of a speech signal to the controller; and an operating mode control unit that switches an operating mode in response to the utterance inhibition request instruction information received from the one microphone and maintains the operating mode.

Further, in the present invention, when the operating mode maintained by the operating mode control unit is an utterance inhibition mode when transmitting the utterance request information, the utterance requesting unit serves as a unit that stops the transmission of the utterance request information.

Furthermore, the present invention is an audio conference system including a controller, a plurality of microphones, and an antenna that makes the controller and the microphones communicate via radio communication, in which at least one of the microphones includes a unit that transmits utterance inhibition request instruction to the controller, the other microphones of the microphones each include an utterance stopping unit that stops, upon receiving utterance inhibition instruction information from the controller, transmission of a speech signal to the controller, and the controller includes: an utterance permitting unit that, in response to utterance request instruction information received from any of the microphones, transmits utterance permission instruction information to the microphone; an utterance inhibiting unit that, in response to the utterance inhibition request instruction information received from any of the microphones, transmits the utterance inhibition instruction information to the other microphones; and an operating mode control unit that switches an operating mode in response to reception of the utterance inhibition request instruction information and maintains the operating mode.

Still furthermore, in the present invention, when an operating mode upon transmitting the utterance request information from the other microphones is an utterance inhibition mode, the operating mode control unit controls the utterance permitting unit so that no utterance permission instruction information is sent to the other microphones.

In addition, the present invention is an audio conference system including a controller, a plurality of microphones, and an antenna that makes the controller and the microphones communicate via radio communication, in which at least one of the microphones has a unit that transmits utterance inhibition request instruction to the controller, the other microphones of the microphones each include: an utterance stopping unit that, upon receiving utterance inhibition instruction information from the controller, stops transmission of a speech signal to the controller; and an operating mode control unit that switches an operating mode in response to the utterance inhibition request instruction information received from the controller and maintains the operating mode, and the controller includes: an utterance permitting unit that, in response to utterance request instruction information received from any of the microphones, transmits utterance permission instruction information to the microphone; and an utterance inhibiting unit that, in response to the utterance inhibition request instruction information received from any of the microphones, transmits the utterance inhibition instruction information to the other microphones.

Further, in the present invention, when an operating mode upon transmitting the utterance request instruction information is an utterance inhibition mode, the operating mode control unit operates the utterance requesting unit so that no utterance permission request information is sent to the controller.

Furthermore, the present invention is an audio conference system including a controller, a plurality of microphones, and an antenna that makes the controller and the microphones communicate via radio communication, in which at least one of the microphones includes a unit that transmits utterance inhibition request information to the other microphones, the other microphones of the microphones each include: an utterance stopping unit that stops, after receiving utterance inhibition instruction information from the one microphone, transmission of a speech signal to the controller; and an operating mode control unit that switches an operating mode in response to the utterance inhibition request instruction information received from the one microphone and maintains the operating mode, and the controller includes: an utterance permitting unit that, in response to utterance request instruction information received from any of the microphones, transmits utterance permission instruction information to the microphone.

Still furthermore, in the present invention, when the operating mode maintained by the operating mode control unit upon transmitting the utterance request information is an utterance inhibition mode, the utterance request unit serves as a unit that stops the transmission of the utterance request information.

Effects of the Invention

According to the present invention, utterance inhibition control for other microphones can be performed with a specific microphone. Thus, in a case where, for example, a debate is heated, the chair of a conference can mandatory inhibit inputs with all the microphones to make the conference proceed smoothly. In addition, no utterance requests from other microphones are permitted during an inhibition mode. Therefore, once utterances are inhibited, the inhibition state can be maintained until the inhibition is lifted. Thus, utterances can be effectively controlled under the chair's discretion.

EXPLANATIONS OF LETTERS OR NUMERALS

| 10 | extension microphone |
| 10a | priority microphone |

-continued

EXPLANATIONS OF LETTERS OR NUMERALS

| 10b | general microphone |
| 10c | priority microphone |
| 10d | general microphone |
| 20 | master control |
| 30 | antenna |

BEST MODE(S) FOR CARRYING OUT THE INVENTION

Figure 1:
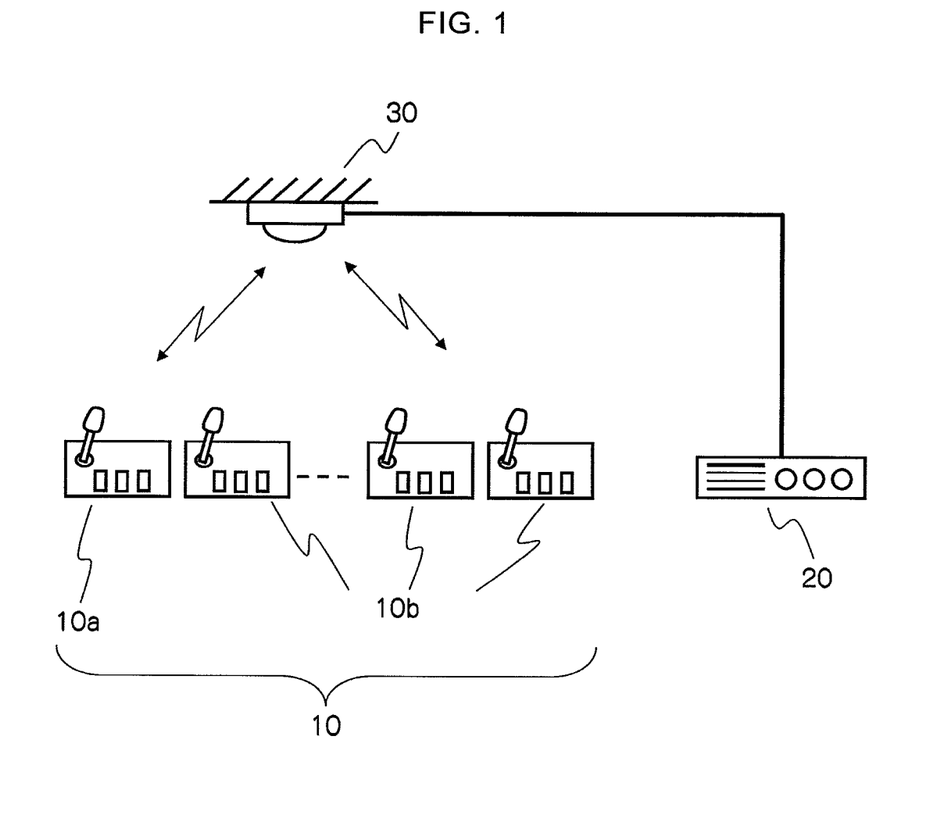
FIG. 1 is a schematic of a configuration of an audio conference system according to the present invention.

Embodiments of an audio conference system according to the present invention will be described with reference to a drawing. FIG. 1 is a schematic of a configuration of the audio conference system according to the present invention.

In FIG. 1, the audio conference system includes: extension microphones 10 including a priority microphone (hereinafter referred to as a "P microphone") 10a with which the chair of a conference, e.g., a chairman, can mandatory stop transmission of a speech signal from a microphone with which an utterance is being made, and general microphones 10b used by general participants; a master control 20 that receives utterance request commands and speech signals input with the extension microphones 10 and performs communication control including utterance permission control and allocation control of frequencies to be used; and an antenna 30 that makes the extension microphones 10 and the master control 20 communicate, receives radio signals emitted from the extension microphones 10 and notifies the master control of the reception, and transmits, for example, a signal sent from the master control to the extension microphones 10 by air.

The P microphone 10a has at least an utterance request button and an utterance inhibition button, which are not shown in the figure, and has a function of transmitting certain commands to the master control 20 in response to a speech signal input by a user or to any of the buttons being pressed. The P microphone 10a also has a function of performing a certain process based on a command transmitted from the master control 20.

The general microphones 10b are used by participants other than the chair and have at least an utterance request button, not shown in the figure, and have a function of transmitting a certain command to the master control 20, in response to a speech input by a user or to the button being pressed. The general microphones 10b also have a function of performing a certain process based on a command transmitted from the master control 20.

The master control 20 receives a command communicated from the extension microphones 10 and performs a process corresponding thereto, and has a function of outputting speech signals input with the extension microphones 10 to a speaker not shown in the figure. The antenna 30 makes the extension microphones 10 and the master control 20 communicate, and performs communication control on the extension microphones 10. A communication system used herein is, for example, an infrared communication system, which is less likely to be wiretapped.

First Embodiment

Figure 2:
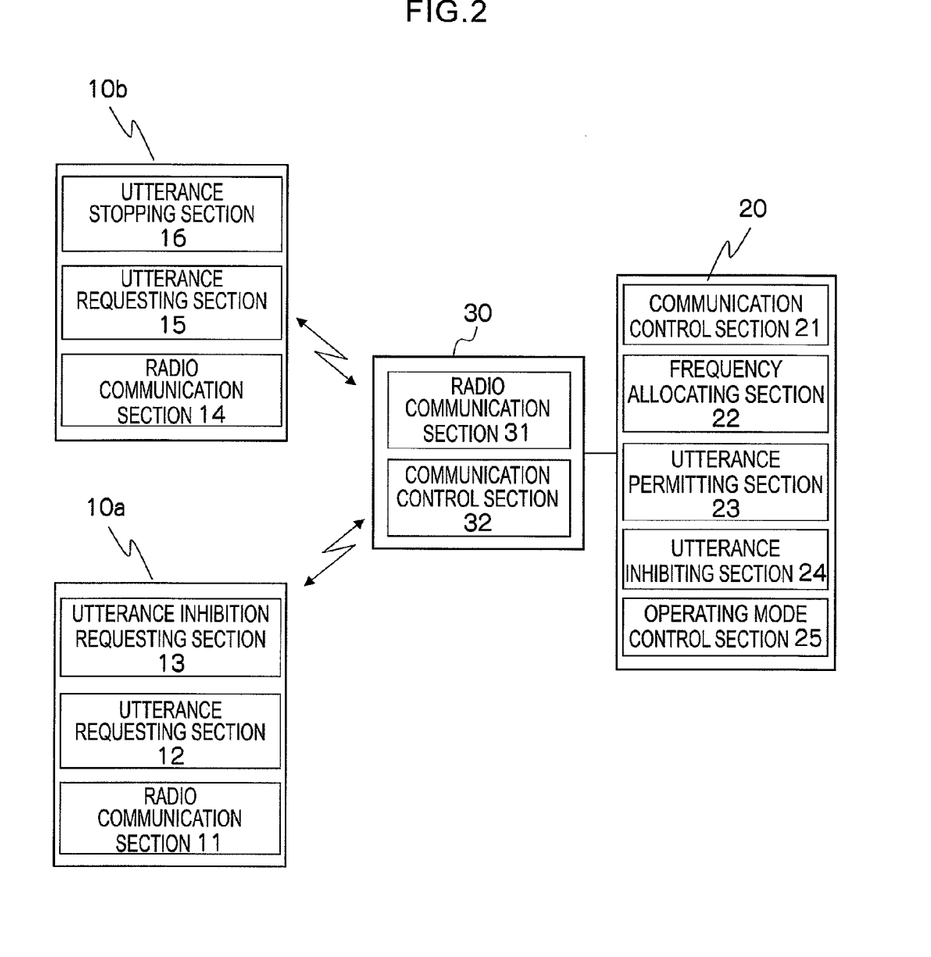
FIG. 2 is a block diagram depicting functional blocks of an embodiment of the audio conference system.

FIG. 2 shows functional blocks of the audio conference system according to the present invention. The P microphone 10a includes at least: a radio communication section 11 that communicates with the antenna 30; an utterance requesting section 12 that detects the pressing of the utterance request button, not shown in the figure, and transmits an utterance request command C31 to the master control 20; and an utterance inhibition requesting section 13 that transmits an utterance inhibition request command C11 to the master control 20 when the utterance inhibition button, not shown in the figure, is pressed.

The general microphones 10b each include at least: a radio communication section 14 that communicates with the antenna 30; an utterance requesting section 15 that detects the pressing of the utterance request button, not shown in the figure, transmits the utterance request command C31 to the master control 20, and further transmits the speech input to the master control 20 in response to an utterance permission command C22 received from the master control 20; and an utterance stopping section 16 that stops transmission of the speech input to the master control 20 when receiving an utterance inhibition command C21 from the master control 20.

The master control 20 includes: a communication control section 21 that controls the antenna 30, which communicates with the extension microphones 10, to control reception and transmission of necessary information between the master control 20 and the extension microphones 10; a frequency allocating section 22 that allocates frequencies so that the frequencies used by the extension microphones 10 do not overlap with each other; an utterance permitting section 23 that transmits the utterance permission command C22 to a general microphone 10b in response to the utterance request command C31 received from the general microphone 10b; an utterance inhibiting section 24 that transmits the utterance inhibition command C21 to the general microphones 10b in response to the utterance inhibition request command C11 received from the P microphone 10a; and an operating mode control section 25 that switches an operating mode to an utterance inhibition mode and instructs the utterance inhibiting section 24 to transmit the utterance inhibition command C21 to the general microphones 10b if the operating mode of the master control 20 is a normal mode at the point where the utterance inhibition request command C11 is received from the P microphone 10a, and switches the operating mode to the normal mode if the operating mode is the utterance inhibition mode at the point where the utterance inhibition request command C11 is received.

The antenna 30 makes the extension microphones 10 and the master control 20 communicate via a radio communication system. The antenna 30 includes: a communication control section 32 that controls the communication with the extension microphones 10 with the frequencies allocated by the master control 20; and a radio communication section 31 that transmits and receives various types of information to and from the extension microphones 10 with the radio frequencies instructed by the communication control section 32.

An embodiment of the audio conference system according to the present invention will be described with reference to the sequence diagram in FIG. 3. Process steps are denoted as S100, S101, and so on.

The description of the present embodiment is given under an assumption that the operation has been performed under the normal mode at the point where the utterance inhibition request command C11 is received.

Figure 3:
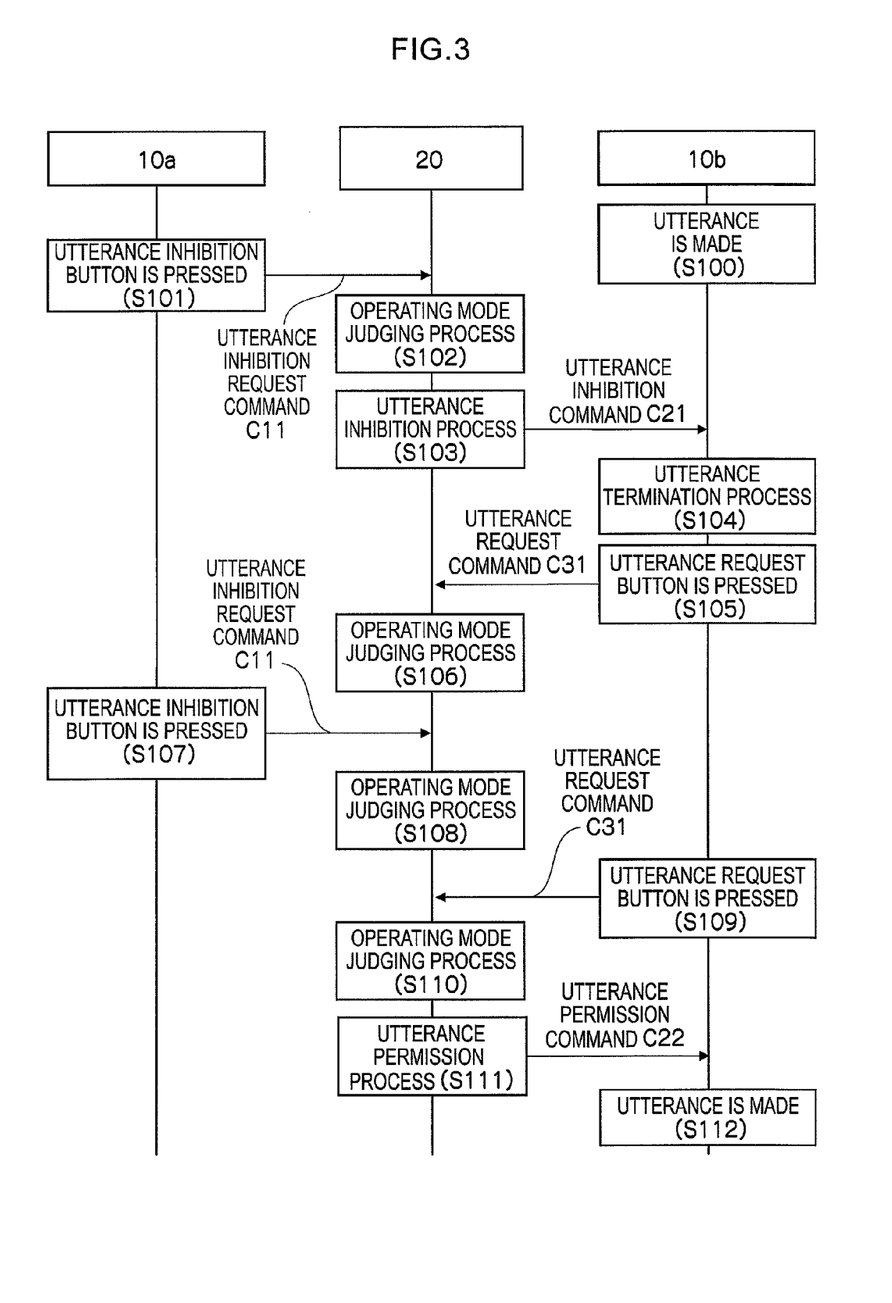
FIG. 3 is a sequence diagram depicting an operational flow of the audio conference system.

In FIG. 3, a general microphone 10b has received the utterance permission command C22 and an utterance is being made therewith (S100).

In such a state, if the utterance inhibition button, not shown in the figure, of the P microphone 10a is pressed, the utterance inhibition requesting section 13 transmits the utterance inhibition request command C11 to the master control 20 (S101).

The master control 20 receiving the utterance inhibition request command C11 judges the current operating mode with the operating mode control section 25, and performs the process of switching from the normal mode to the utterance inhibition mode, or from the utterance inhibition mode to the normal mode (S102).

The operating mode control section 25 switches the operating mode to the utterance inhibition mode and instructs the utterance inhibiting section 24 to collectively transmit the utterance inhibition command C21. The utterance inhibiting section 24 transmits the utterance inhibition command C21 to all the general microphones 10b (S103).

The general microphones 10b receiving the utterance inhibition command C21 stop, with the utterance stopping section 16, the transmission of the speech input to the master control 20 (S104).

When the user of a general microphone 10b presses the utterance request button thereafter to obtain an utterance permission again, the utterance request command C31 is transmitted to the master control 20 (S105).

The master control 20 receiving the utterance request command C31 judges the operating mode with the operating mode control section 25 (S106). Because the current operating mode is the utterance inhibition mode, the operating mode control section 25 performs no process in response to the utterance request command C31 and thus, no utterance permission command C22 is transmitted to the general microphones 10b.

When the utterance inhibition button of the P microphone 10a is pressed thereafter, and the utterance inhibition request command C11 is transmitted to the master control 20 (S107), the operating mode control section 25 judges the current operating mode and performs the operating mode switching process (S108).

Because the operating mode is the utterance inhibition mode in this state, the operating mode control section 25 performs the process of switching the operating mode to the normal mode. When the utterance request button of a general microphone 10b is pressed thereafter and the utterance request command C31 is transmitted to the master control 20 (S109), because the operating mode is the normal mode (S110), the operating mode control section 25 instructs the utterance permitting section 23 to transmit the utterance permission command C22 to the general microphone 10b (S111).

The general microphone 10b receiving the utterance permission command C22 can be used to make an utterance through transmitting the speech input to the master control 20 (S112).

Second Embodiment

Another embodiment of the audio conference system according to the present invention will be described with reference to the functional block diagram in FIG. 4 and the sequence diagram in FIG. 5.

Figure 4:
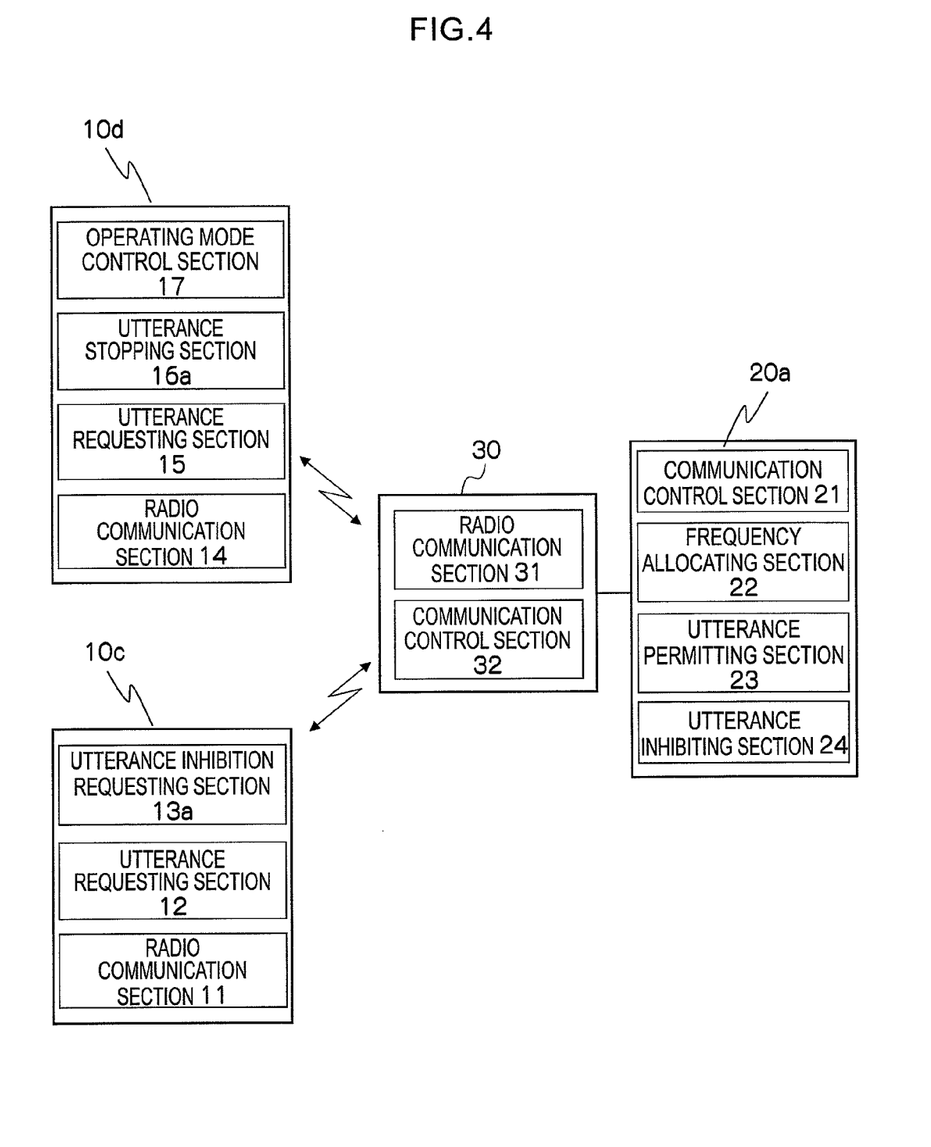
FIG. 4 is a block diagram depicting functional blocks of another embodiment of the audio conference system according to the present invention.
Figure 5:
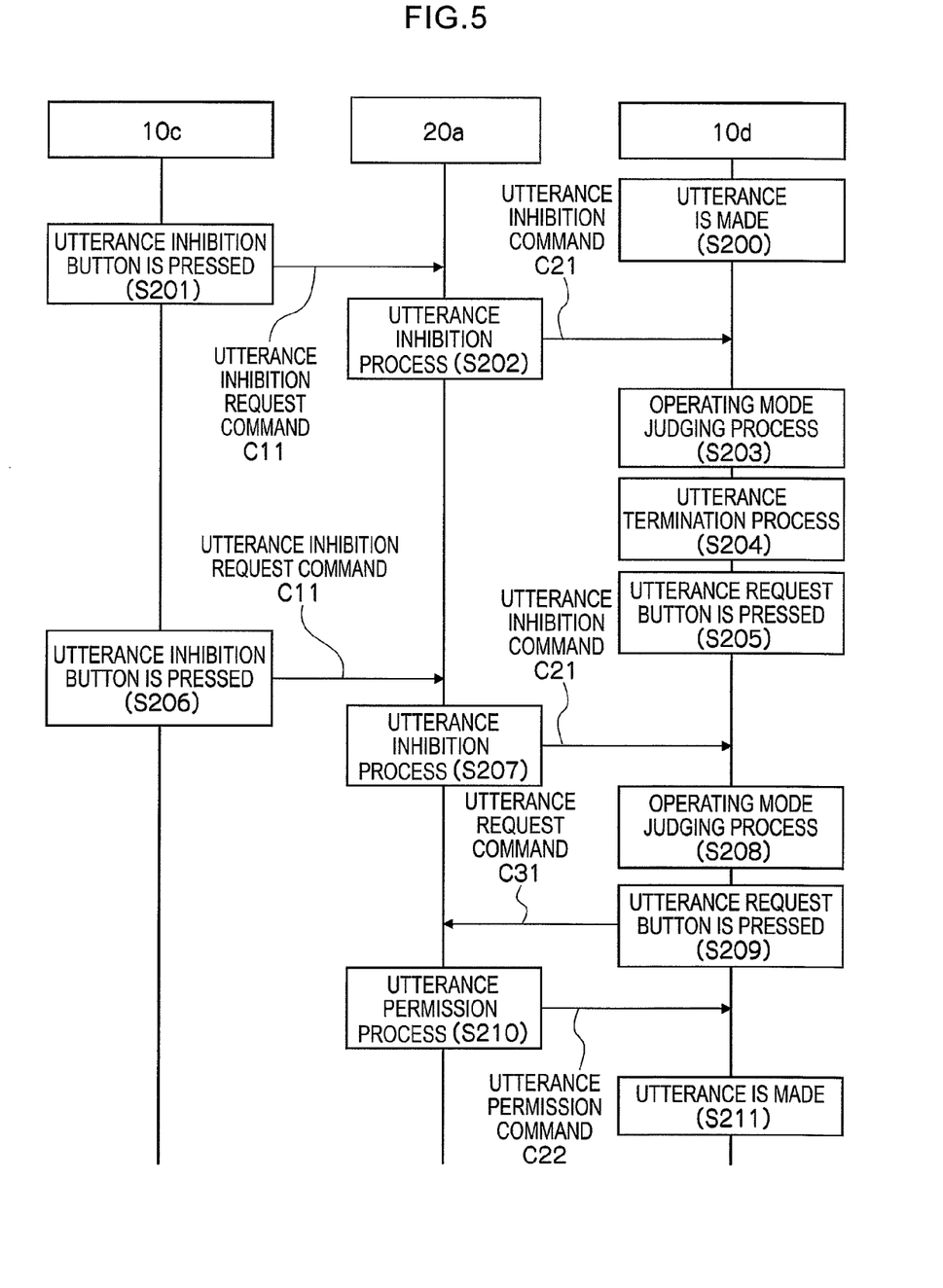
FIG. 5 is a sequence diagram depicting an operational flow of the audio conference system.

In FIG. 4, a P microphone 10c includes at least: the radio communication section 11 that communicates with the antenna 30; the utterance requesting section 12 that detects the pressing of the utterance request button, not shown in the figure, transmits the utterance request command C31 to a master control 20a, and receives the utterance permission command C22 from the master control 20a and controls the transmission of the speech input to the master control 20a; and an utterance inhibition requesting section 13a that transmits the utterance inhibition command C21 to the master control 20a or to the general microphones 10d when the utterance inhibition button, not shown in the figure, is pressed.

General microphones 10d each include at least: the radio communication section 14 that communicates with the antenna 30; the utterance requesting section 15 that detects the pressing of the utterance request button, not shown in the figure, transmits the utterance request command C22 to the master control 20a, and receives the utterance permission command C22 from the master control 20a and controls the transmission of the speech input to the master control 20a; an operating mode control section 17 that judges the operating mode when receiving the utterance inhibition request command C11 from the master control 20a or the P microphone 10c and switches the operating mode to the utterance inhibition mode if the operating mode is the normal mode or switches to the normal mode if the operating mode is the utterance inhibition mode; and an utterance stopping section 16a that stops the transmission of the speech input to the master control 20a in accordance with an instruction from the operating mode control section 17.

The master control 20a does not include the operating mode control section 25, which the master control 20 described in the first embodiment includes, and includes: the communication control section 21 that controls the antenna 30, which communicates with the extension microphones 10, to control communication of necessary information between the master control 20a and the extension microphones 10; the frequency allocating section 22 that allocates frequencies so that the frequencies used by the extension microphones 10 do not overlap with each other; the utterance permitting section 23 that transmits, in response to the utterance request command C31 received from a general microphone 10d, the utterance permission command C22 to the general microphone 10b; and the utterance inhibiting section 24 that receives the utterance inhibition request command C11 received from the P microphone 10c and transmits the utterance inhibition command C21 to the general microphones 10d. The configuration of the antenna 30 is the same as that in the first embodiment and thus, the description thereof is omitted.

The flow of the utterance control process performed by the audio conference system will be described with reference to the sequence diagram in FIG. 5. Process steps are denoted as S200, S201, and so on. In FIG. 5, a general microphone 10d has received the utterance permission command C22 and an utterance is being made therewith (S200).

In such a state, if an utterance inhibition button, not shown in the figure, of the P microphone 10c is pressed, the utterance inhibition requesting section 13a transmits the utterance inhibition request command C11 to the master control 20a (S201). The master control 20a receiving the utterance inhibition request command C11 transmits the utterance inhibition command C21 to the general microphone 10d (S202).

The general microphone 10d receiving the utterance inhibition command C21 judges the current operating mode with the operating mode control section 17 and performs the process of switching from the normal mode to the utterance inhibition mode or the process of switching from the utterance inhibition mode to the normal mode (S203).

Here, the description is given under an assumption that the operation has been performed under the normal mode. The operating mode control section 17 instructs the utterance stopping section 16a to stop the utterances after switching the operating mode from the normal mode to the utterance inhibition mode. Thus, the transmission of a speech input with the general microphone 10d to the master control 20a is stopped (S204).

When an utterance request button, not shown in the figure, of the general microphone 10d is pressed thereafter, the operating mode control section 17 judges the current operating mode. Because the operating mode at this time is the utterance inhibition mode, the utterance requesting section 15 does not transmit the utterance request command C31 (S205).

When the utterance inhibition button, not shown in the figure, of the P microphone 10c is pressed thereafter, and the utterance inhibition request command C11 is transmitted to the master control 20a (S206), the master control 20a transmits the utterance inhibition command C21 to the general microphone 10d (S207).

The general microphone 10d receiving the utterance inhibition command C21 judges the current operating mode with the operating mode control section 17 (S208). Because the operating mode at this time is the utterance inhibition mode, the process to switch the operating mode to the normal mode is performed.

When the utterance request button, not shown in the figure, of the general microphone 10d is pressed thereafter, the utterance request command C31 is transmitted to the master control 20a because the operating mode is the normal mode (S209).

The master control 20a receiving the utterance request command C31 transmits the utterance permission command C22 to the general microphone 10d (S210). The utterance can be made with the general microphone 10d that has received the utterance permission command C22 (S211).

Third Embodiment

Still another embodiment of the audio conference system depicted in FIG. 4 will be described with reference to the sequence diagram in FIG. 6. Also in FIG. 6, steps are denoted as S300, S301, and so on.

Figure 6:
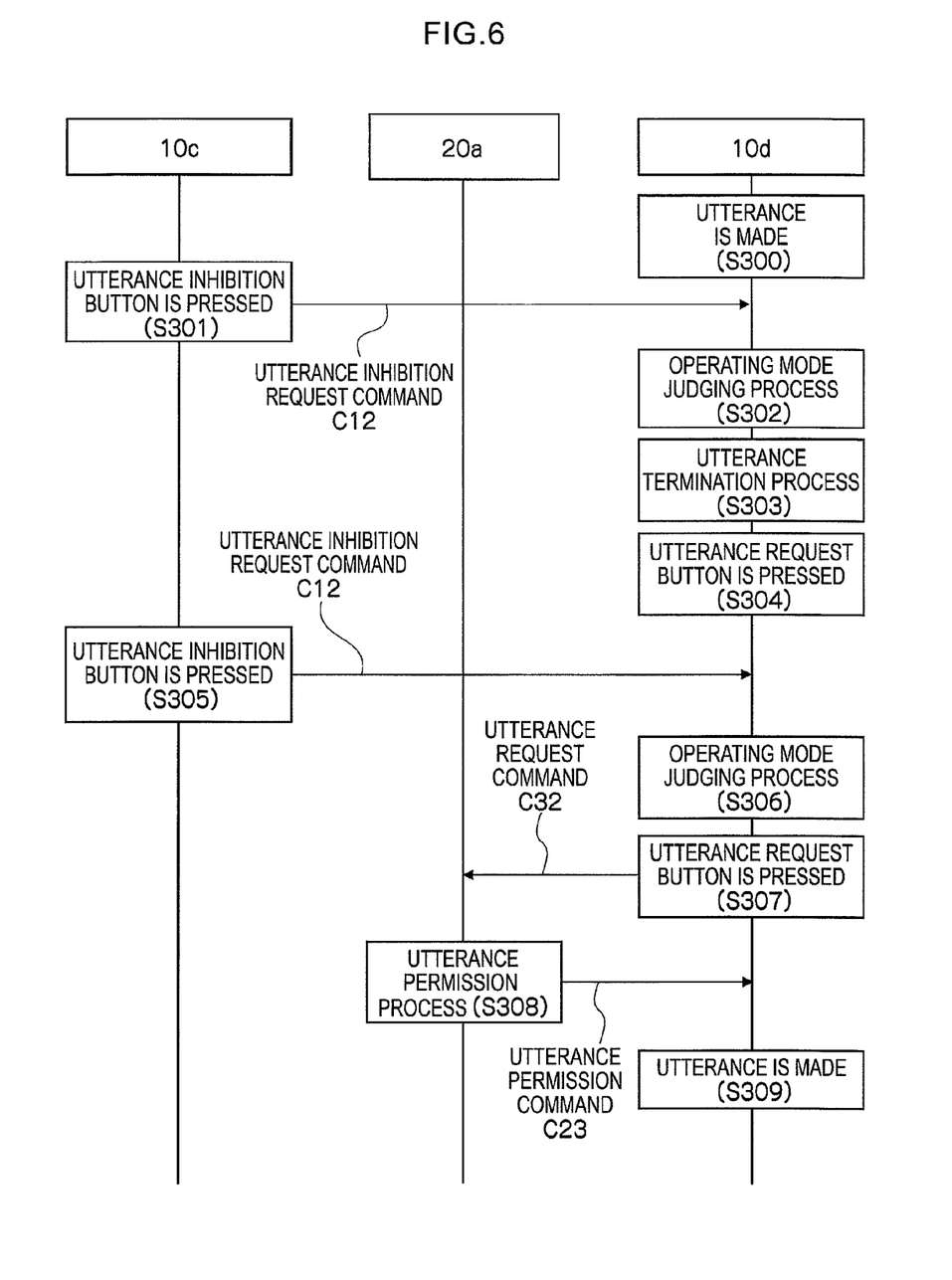
FIG. 6 is a sequence diagram depicting an operation in still another embodiment of the audio conference system.

In FIG. 6, a general microphone 10d has received an utterance permission command C23 and the utterance is being made therewith (S300). In this state, when the utterance inhibition button, not shown in the figure, of the P microphone 10c is pressed, the utterance inhibition requesting section 13a transmits an utterance inhibition request command C12 to the general microphone 10d (S301).

The general microphone 10d receiving the utterance inhibition request command C12 judges the current operating mode with the operating mode control section 17 and performs the process of switching from the normal mode to the utterance inhibition mode or the process of switching from the utterance inhibition mode to the normal mode (S302).

In the description of the present embodiment, the description is given about a case where the operating mode at the time of receiving the utterance inhibition command is the normal mode. The operating mode control section 17 instructs the utterance stopping section 16a to stop the utterance after switching the operating mode to the utterance inhibition mode. Thus, the transmission of the speech input with the general microphone 10d to the master control 20a is stopped (S303).

When the utterance request button, not shown in the figure, of the general microphone 10d is pressed thereafter, the operating mode control section 17 judges the current operating mode. Because the utterance inhibition mode is currently in effect, the utterance requesting section 15 does not transmit an utterance request command C32 (S304).

When the utterance inhibition button, not shown in the figure, of the P microphone 10c is pressed thereafter, the utterance inhibition request command C12 is transmitted to the general microphone 10d (S305). The general microphone 10d receiving the utterance inhibition request command C12 judges the current operating mode with the operating mode control section 17 (S306). Because the operating mode at this time is the utterance inhibition mode, the process to switch the operating mode to the normal mode is performed.

When the utterance request button, not shown in the figure, of the general microphone 10d is pressed thereafter, because the current operating mode is the normal mode, the utterance request command C31 is transmitted to the master control 20 (S307). The master control 20a receiving the utterance request command C31 transmits the utterance permission command C22 to the general microphone 10d (S308). The utterance can be made with the general microphone 10d that has received the utterance permission command C22 (S309).

The extension microphones 10 used in the descriptions of the first to the third embodiments transmit the utterance request command C22 when the utterance request button, not shown in the figure, is pressed. The means for transmitting the utterance request command is not limited thereto, and instead, an extension microphone 10 can be used that has an utterance requesting unit that detects a speech input to the extension microphone 10 and automatically transmits the utterance request command C22.

INDUSTRIAL APPLICABILITY

The present invention allows an authorized person to effectively control utterances, so that the utterances are not conflicted to bring confusion in a situation where many people gather around to make utterances, and thus can be applied regardless of the number of participants.

The invention claimed is:

1. An audio conference system comprising a controller, a primary microphone, a plurality of general microphones, and an antenna that makes the controller and the microphones communicate via radio communication, wherein
the controller includes:
an utterance permitting unit that, in response to utterance request information received from any microphone, transmits utterance permission information to the microphone requesting an utterance;
an utterance inhibiting unit that, in response to utterance inhibition request information received from the primary microphone, transmits utterance inhibition information to the general microphones;
an operating mode control unit that switches an operating mode of the general microphones when the response of the utterance inhibition request information is received, and maintains the operating mode, that has been switched, of the general microphones, after the utterance inhibition information is transmitted, and wherein each of the general microphones includes:
an utterance stopping unit that stops transmission of a speech signal to the controller upon receiving the utterance inhibition information from the controller.

2. The audio conference system according to claim 1, wherein, when an operating mode at a point where the utterance request information is received from any of the microphones is an utterance inhibition mode, the operating mode control unit operates the utterance permitting unit so that no utterance permission information is transmitted to the microphone requesting the utterance.

3. An audio conference system comprising a controller, a primary microphone, a plurality of general microphones, and an antenna that makes the controller and the microphones communicate via radio communication, wherein the controller includes:

an utterance permitting unit that, in response to utterance request information received from any microphone, transmits utterance permission information to the microphone requesting an utterance;
an utterance inhibiting unit that, in response to utterance inhibition request information received from the primary microphone, transmits utterance inhibition information to the general microphones; and
wherein each of the general microphones includes:
an utterance stopping unit that transmits the utterance inhibition request information to the controller and stops transmission of a speech signal to the controller upon receiving the utterance inhibition information from the controller; and
an operating mode control unit that switches its own operating mode in response to the utterance inhibition request information received from the controller and maintains the operating mode that has been switched.

4. The audio conference system according to claim 3, wherein,
each of the general microphones further includes an utterance requesting unit that transmits utterance request information to the controller, and
when the operating mode upon transmitting the utterance request information is an utterance inhibition mode, the operating mode control unit operates the utterance requesting unit so that no utterance request information is transmitted to the controller.

5. An audio conference system comprising a controller, a primary microphone, a plurality of general microphones, and an antenna that makes the controller and the microphones communicate via radio communication,
wherein the controller includes an utterance permitting unit that, in response to utterance request information received from any microphone, transmits utterance permission information to the microphone requesting an utterance; and
each of the general microphones includes:
an utterance stopping unit with which, after receiving utterance inhibition request information from the primary microphone, stops transmission of a speech signal to the controller;
an operating mode control unit that switches an operating mode in response to the utterance inhibition request information received from the primary microphone and maintains the switched operating mode, after the transmission of the speech signal is stopped; and
an utterance requesting unit that stops transmission of utterance request information when the operating mode maintained by the operating mode control unit upon transmitting the utterance request information to the controller is an utterance inhibition mode, and transmits the utterance request information under an utterance permission mode.

6. An audio conference system comprising a controller, a primary microphone, a plurality of general microphones, and an antenna that makes the controller and the microphones communicate via radio communication, wherein
the primary microphone includes a unit that transmits utterance inhibition request information to the controller,
each of the general microphones includes an utterance stopping unit that stops transmission of a speech signal to the controller, upon receiving utterance inhibition information from the controller, and the controller includes:
- an utterance permitting unit that, in response to utterance request information received from any microphone, transmits utterance permission information to the microphone requesting an utterance;
- an utterance inhibiting unit that, in response to the utterance inhibition request information received from the primary microphone, transmits utterance inhibition information to the general microphones; and
- an operating mode control unit that switches an operating mode of the general microphones in response to reception of the utterance inhibition request information, and maintains the switched operating mode of the general microphones, after the transmission of the speech signal is stopped.

7. The audio conference system according to claim 6, wherein, when the current operating mode is an utterance inhibition mode, the operating mode control unit controls the utterance permitting unit so that no utterance permission information is sent to the general microphones in response to the utterance request information.

8. An audio conference system comprising a controller, a primary microphone, a plurality of general microphones, and an antenna that makes the controller and the microphones communicate via radio communication, wherein
the primary microphone has a unit that transmits utterance inhibition request information to the controller,
each of the general microphones includes:
- an utterance stopping unit that, upon receiving utterance inhibition information from the controller, stops transmission of a speech signal to the controller; and
- an operating mode control unit that switches an operating mode in response to the utterance inhibition information received from the controller, and maintains the switched operating mode, when the utterance request information is received, after the transmission of the speech signal is stopped, and the controller includes:
- an utterance permitting unit that, in response to utterance request information received from any microphone, transmits utterance permission information to the microphone requesting an utterance; and
- an utterance inhibiting unit that, in response to the utterance inhibition request information received from the primary microphone, transmits utterance inhibition information to the general microphones.

9. The audio conference system according to claim 8, wherein,
each of the general microphones further includes an utterance requesting unit the transmits utterance request information to the controller; and
when the current operating mode is an utterance inhibition mode, the operating mode control unit controls the utterance requesting unit so that no utterance request information is sent to the controller.

10. An audio conference system comprising a controller, a primary microphone, a plurality of general microphones, and an antenna that makes the controller and the microphones communicate via radio communication, wherein
the primary microphone includes a unit that transmits utterance inhibition request information to the general microphones,
each of the general microphones includes:
- an utterance stopping unit that, after receiving utterance inhibition request information from the primary microphone, stops transmission of a speech signal to the controller; and
- an operating mode control unit that switches an operating mode in response to the utterance inhibition request information received from the primary microphone, and maintains the switched operating mode after the transmission of the speech signal is stopped; and
- an utterance requesting unit that stops transmission of utterance request information when the operating mode maintained by the operating mode control unit upon transmitting the utterance request information to the controller is an utterance inhibition mode, and transmits the utterance request information under an utterance permission mode, and the controller includes:
- an utterance permitting unit that, in response to utterance request information received from any microphone, transmits utterance permission information to the microphone requesting an utterance.

11. An audio conference system comprising a controller, a plurality of microphones, and an antenna that makes the controller and the microphones communicate via radio communication,
wherein the plurality of microphones includes at least one first microphone and at least one second microphone,
the first microphone includes:
- an utterance inhibition request unit that transmits utterance inhibition request information to the controller; and
- a first utterance request unit that transmits the utterance request information to the controller, the second microphone includes:
- an utterance stopping unit that stops, upon receiving utterance inhibition information from the controller, transmission of a speech signal to the controller; and
- a second utterance request unit that transmits the utterance request information to the controller, and the controller includes:
- an utterance permitting unit that, in response to utterance request information received from any of the first and the second microphones, transmits utterance permission information to the first and the second microphones;
- an utterance inhibiting unit that, in response to the utterance inhibition request information received from the first microphone, transmits utterance inhibition information to the second microphone; and
- an operating mode control unit that switches an operating mode of the second microphone in response to reception of the utterance inhibition request information, and maintains the operating mode, that has been switched, of the second microphone.

12. An audio conference system comprising a controller, a plurality of microphones, and an antenna that makes the controller and the microphones communicate via radio communication,
wherein the plurality of microphones includes at least one first microphone and at least one second microphone,
the first microphone includes:
- an utterance inhibition request unit that transmits utterance inhibition request information to the controller; and
- a first utterance request unit that transmits the utterance request information to the controller, the second microphone includes:
- a second utterance request unit that transmits the utterance request information to the controller,
- an utterance stopping unit that, upon receiving utterance inhibition information from the controller, stops transmission of a speech signal to the controller; and
- an operating mode control unit that switches an operating mode of the second microphone in response to utterance inhibition request information received from the controller, and maintains the operating mode that has been switched, and the controller includes:
- an utterance permitting unit that, in response to utterance request information received from the first and second microphones, transmits utterance permission information to the first and the second microphones; and
- an utterance inhibiting unit that, in response to the utterance inhibition request information received from the first microphone, transmits utterance inhibition information to the second microphone.

* * * * *

UNITED STATES PATENT AND TRADEMARK OFFICE
CERTIFICATE OF CORRECTION

PATENT NO. : 8,452,027 B2
APPLICATION NO. : 12/671146
DATED : May 28, 2013
INVENTOR(S) : Manami Katsuno Page 1 of 1

It is certified that error appears in the above-identified patent and that said Letters Patent is hereby corrected as shown below:

In the Claims:

Column 13, Line 54, Claim 9: Delete "the" and insert --that--

Signed and Sealed this
Twenty-fourth Day of September, 2013

Teresa Stanek Rea
*Deputy Director of the United States Patent and Trademark Office*